(12) United States Patent
Anderson et al.

(10) Patent No.: US 9,788,156 B1
(45) Date of Patent: Oct. 10, 2017

(54) GEOFENCE DETERMINATION

(71) Applicant: International Business Machines Corporation, Armonk, NY (US)

(72) Inventors: Evelyn R. Anderson, Houston, TX (US); Michael Bender, Rye Brook, NY (US); Michael Boone, Lutz, FL (US); Rhonda L. Childress, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/085,408

(22) Filed: Mar. 30, 2016

(51) Int. Cl.
  *H04W 24/00* (2009.01)
  *H04W 4/02* (2009.01)
  *H04W 4/04* (2009.01)

(52) U.S. Cl.
  CPC ............. *H04W 4/021* (2013.01); *H04W 4/04* (2013.01)

(58) Field of Classification Search
  CPC ................................ H04W 4/021; H04W 4/04
  USPC .................................. 455/456.1, 456.3, 410
  See application file for complete search history.

(56) References Cited

U.S. PATENT DOCUMENTS

| | | | |
|---|---|---|---|
| 6,721,652 B1 | 4/2004 | Sanqunetti | |
| 7,286,929 B2 | 10/2007 | Staton et al. | |
| 7,848,765 B2* | 12/2010 | Phillips | G08B 21/0236 455/404.2 |
| 8,145,424 B2 | 3/2012 | Johnson et al. | |
| 8,284,748 B2* | 10/2012 | Borghei | H04W 4/021 370/252 |
| 8,396,485 B2* | 3/2013 | Grainger | G01S 5/0257 455/456.1 |
| 8,412,166 B2* | 4/2013 | Ellanti | H04M 1/72572 455/414.2 |
| 8,457,596 B2* | 6/2013 | Smith | G08B 13/1672 455/410 |
| 8,489,119 B1* | 7/2013 | Fraccaroli | H04W 4/02 379/201.06 |
| 8,504,061 B2* | 8/2013 | Grainger | H04W 4/021 368/10 |
| 8,577,590 B2* | 11/2013 | Doyle | G06Q 10/08 342/450 |
| 8,593,276 B2* | 11/2013 | Doyle | G08B 13/1427 340/539.11 |
| 8,606,260 B2* | 12/2013 | Chatterjee | H04W 24/10 370/241 |

(Continued)

FOREIGN PATENT DOCUMENTS

WO     2014072510 A2     5/2014

OTHER PUBLICATIONS

"How to Create Geofences using Google Map?", Browse Xora Support, downloaded on Jan. 27, 2016, 9 pages, <http://mycusthelp.net/xora/_cs/AnswerDetail.aspx?sSessionID=7269219206UKZXYIHX-TCYCUXNMSKRASHDIEVPXJQ&Inc=431687&=>.

(Continued)

*Primary Examiner* — Marceau Milord
(74) *Attorney, Agent, or Firm* — Maeve Carpenter (57) ABSTRACT

A method, executed by one or more processors, includes determining a geofence by receiving an indication to determine a first location. The method includes determining a second location. Furthermore, the method includes connecting sequentially each of a set of sequentially determined locations to determine a geofence, wherein the set of sequentially determined locations includes at least the first location and the second location.

19 Claims, 5 Drawing Sheets

(56) References Cited

U.S. PATENT DOCUMENTS

| | | | |
|---|---|---|---|
| 8,626,187 B2* | 1/2014 | Grosman | H04M 1/72572 455/404.2 |
| 8,638,720 B2* | 1/2014 | Huang | H04W 4/021 370/328 |
| 8,653,956 B2* | 2/2014 | Berkobin | G08G 1/207 340/426.1 |
| 9,113,298 B2* | 8/2015 | Qiu | H04W 4/021 |
| 9,119,034 B2* | 8/2015 | Meredith | H04W 4/021 |
| 9,204,257 B1* | 12/2015 | Mendelson | G08G 1/14 |
| 9,420,423 B1* | 8/2016 | Mendelson | H04W 4/021 |
| 9,551,775 B2* | 1/2017 | Rangarajan | G01S 1/08 |
| 2006/0200305 A1 | 9/2006 | Sheha et al. | |
| 2008/0125965 A1 | 5/2008 | Carani et al. | |
| 2011/0121964 A1 | 5/2011 | Bannard | |
| 2012/0001928 A1 | 1/2012 | Sheha et al. | |
| 2013/0253832 A1* | 9/2013 | Nallu | G06Q 30/0633 701/537 |
| 2013/0310053 A1* | 11/2013 | Srivastava | H04W 4/021 455/446 |
| 2013/0337789 A1* | 12/2013 | Johnson | H04W 4/02 455/414.1 |
| 2014/0059695 A1* | 2/2014 | Parecki | G06F 21/60 726/26 |
| 2014/0258201 A1* | 9/2014 | Finlow-Bates | G01S 19/42 706/46 |
| 2015/0002281 A1 | 1/2015 | Berkobin et al. | |
| 2015/0120183 A1* | 4/2015 | Annapureddy | G01C 21/3688 701/430 |
| 2015/0365799 A1 | 12/2015 | Sheha et al. | |
| 2016/0066151 A1* | 3/2016 | Palanki | H04L 67/10 455/456.1 |
| 2016/0360363 A1* | 12/2016 | Mochizuki | G01S 5/0289 |

OTHER PUBLICATIONS

"How to change the shape of a Geofence", Stack Overflow, Android, edited Aug. 1, 2013, 2 pages, <http://stackoverflow.com/questions/18005648/how-to-change-the-shape-of-a-geofence>.

"Mobile Device Resource Conservation during Geo-Location Operations", An IP.com Prior Art Database Technical Disclosure, IP.com No. 000231493, Oct. 2, 2013, 18 pages, <http://ip.com/IPCOM/000231493>.

"System and Method for Intelligent Position Location via Mobile Device", An IP.com Prior Art Database Technical Disclosure, IP.com No. 000241999, Jun. 12, 2015, 7 pages, <http://ip.com/IPCOM/000241999>.

"Tierra—Geofence Shapes", TOPCON Precision Agriculture, downloaded on Feb. 10, 2016, 1 page, <http://ag.topconpositioning.com/video/tierra-geofence-shapes>.

"What is geo-fencing (geofencing)?", Definition from WhatIs.com, Copyright 1999-2016, TechTarget, downloaded on Feb. 10, 2016, 17 pages, <http://whatis.techtarget.com/definition/geofencing>.

"How to Create a Route Geofence", Efficient Fleets, downloaded on Mar. 24, 2016, 3 pages, <https://wwww.efficientfleets-gpstracking.com/how-to-create-a-route-geofence/>.

* cited by examiner

GEOFENCE DETERMINATION

BACKGROUND OF THE INVENTION

The present invention relates generally to the field of positional tracking and more particularly to a geofence creation using a mobile device.

A geofence is a virtual perimeter or a virtual boundary for a geographic area. A geofence is commonly used with a location-aware device (e.g., a mobile device or a wearable computing device) that is using a location-based service (LBS) such as a global positioning system (GPS) to determine if a user is entering or exiting a geofenced area. When a user carrying a location aware device crosses a geofence boundary, an alert or notification may be sent to the location aware device (e.g., smart phone) user as well as generating a message to the geofence operator who sets up and/or maintains the geofence.

SUMMARY

Embodiments of the present invention disclose a method, a computer program product, and a system to determine a geofence by one or more processors receiving an indication to determine a first location. The method includes the processors determining a second location. Furthermore, the method includes the processors connecting sequentially each of a set of sequentially determined locations to determine a geofence, wherein the set of sequentially determined locations includes at least the first location and the second location.

DETAILED DESCRIPTION

Embodiments of the present invention recognize that typically, a geofence is generated by a radius around a point location or a target area such as a store, generated as pre-determined distance from a road, or as a geofence boundary on a map such as a park boundary determined using map coordinates or geographic coordinates.

Embodiments of the present invention provide a method, a computer program product, and a system to create a geofence from a set of locations of a mobile device generated as a user of the mobile device travels along a desired geofence boundary.

Figure 1:
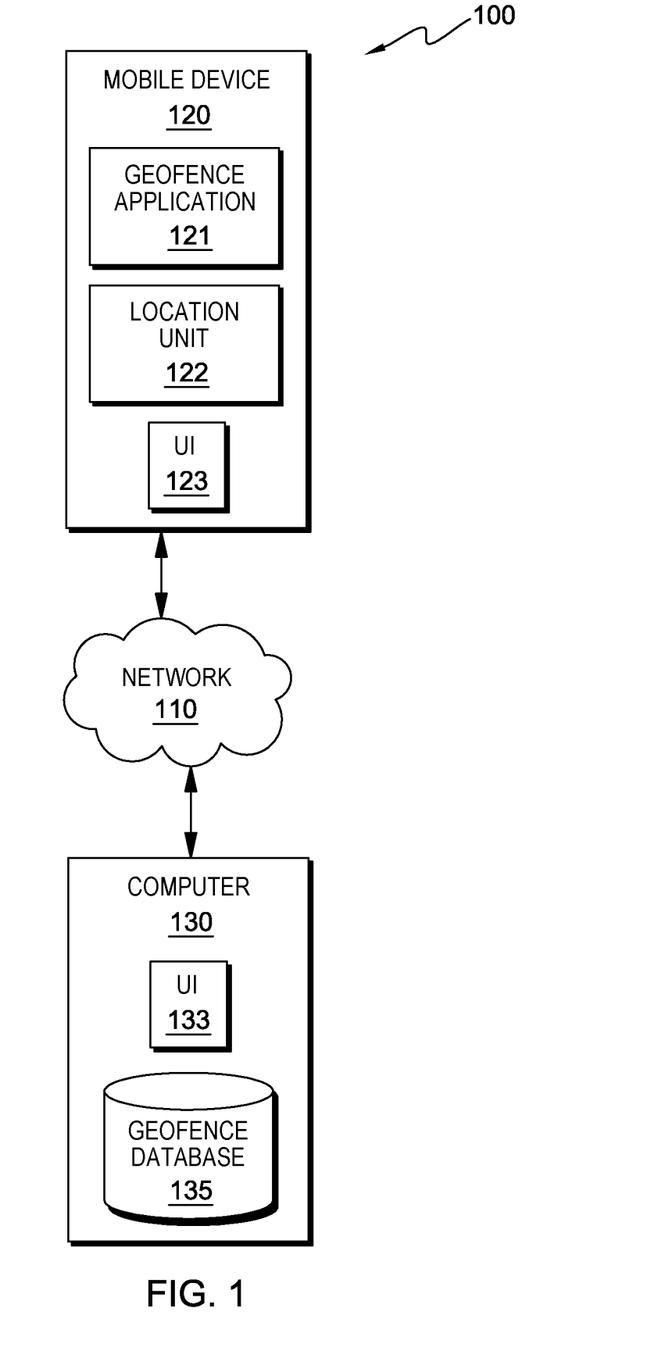
FIG. 1 is a functional block diagram illustrating a distributed data processing environment, in accordance with at least one embodiment of the present invention.

FIG. 1 is a functional block diagram illustrating a distributed data processing environment, generally designated 100, in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted, distributed data processing environment 100 includes mobile device 120 and computer 130 interconnected over network 110. Network 110 can include, for example, a telecommunications network, a local area network (LAN), a virtual LAN (VLAN), a wide area network (WAN), such as the Internet, or a combination of the these and can include wired or wireless connections. Network 110 can include one or more wired and/or wireless networks that are capable of receiving and transmitting data including receiving signals such as radio waves and location information such as a global positioning system (GPS) location from global positioning system or an indoor location from a an indoor location system that may be used for creating a geofence. In general, network 110 can be any combination of connections and protocols that will support communications between mobile device 120 and computer 130 and other computing devices (not shown) within distributed data processing environment 100.

Examples of mobile device 120 include a smart phone, a wearable computer such as a smart watch, a hand held device such as a tablet, a personal digital assistant (PDA), a notebook computer or any other movable computing device capable of providing location data or connecting to a GPS or other location determination system via network 110. In various embodiments, mobile device 120 is a mobile computing device such as a smart phone with location determination capability. Mobile device 120 may receive and send data such as a location or a GPS position to computer 130 and other computing devices (not shown) in distributed data processing environment 100. As depicted, mobile device 120 includes geofence application 121, location unit 122 and user interface (UI) 123. Mobile device 120 using location unit 122 may intermittently determine a user's location and receive or send information (e.g., GPS coordinates or indoor location coordinates) to computer 130. Mobile device 120 may send geofence data such as determined locations for a geofence boundary to geofence database 135 on computer 130.

Geofence application 121 determines a geofence boundary for a desired geofenced area. Geofence application 121 provides a capability to create a geofence. A geofence for a desired geofenced area may be determined by geofence application 121 as the user of mobile device 120 walks, drives or otherwise moves along a desired geofence boundary. The desired geofenced area for a geofence created by geofence application 121 may be an irregularly shaped area or a polygon-shaped area for any shape geofenced area. The geofence boundary for a geofence created by geofence application 121 can be based on intermittently or continuously received location data such as GPS locations for a geofence boundary. Geofence application 121 identifies the geofence boundary using data or locations determined by geofence application 121 using location unit 122 as a user of mobile device 120 moves along a perimeter of the desired geofence boundary.

While geofence application 121 creates irregularly shaped geofences, in an embodiment, geofence application 121 creates a geofence with a shape that includes one or more polygon or known geometric shapes. For example, geofence application 121 may create an oval shaped geofence, a square shaped geofence, or a geofence that is a partial perimeter along a stream or across an entrance to a manufacturing area.

Geofence application 121 may send the data for a geofence to geofence database 135 on computer 130 and/or may store the geofence data locally in persistent storage or in a database on mobile device 120. In various embodiments, geofence application 121 creates and maintains operation of the geofence. In an embodiment, computer 130 maintains the created geofence (e.g., tracks entries/exits and/or sends alerts). While depicted on mobile device 120 in FIG. 1, in some embodiments, geofence application 121 resides on computer 130. Geofence application 121 sends and receives data from location unit 122 and geofence database 135 via network 110.

Location unit 122 is a location determination device or application providing mobile device 120 with the capability to determine a current location for mobile device 120. In various embodiments, location unit 122 may include a GPS receiver and may determine a location of mobile device 120 based on one or more signals received from GPS satellites. In other embodiments, location unit 122 uses another location determination technology. For example, location unit 122 uses a system such as an RF identification (RFID) system, a real-time locating system, an indoor positioning system, an optical positioning system, a hybrid positioning system using more than one positioning technologies (e.g., GPS and Wi Fi positioning data) to determine a location or other known location determination method. In some embodiments, location unit 122 is a handheld or wearable location determination device (not included in mobile device 120) such as an RF tag that sends location tracking data to geofence application 121 as a user carrying the RF tag travels along a geofence boundary.

UI 123 on mobile device 120 is a user interface providing an interface between a user and computer 130, and enables a user of mobile device 120 to interact with programs and data on mobile device 120, computer 130 and other computing devices (not shown in FIG. 1). UI 123 may be any known user interface such as a graphical user interface (GUI), an active area or line for text inputs, a web user interface (WUI), or other type of user interface and can display text, documents, user options, application interfaces, and instructions for operation such as commands, and include the information that a program presents to a user. In an embodiment, UI 123 receives a user input via a touch screen, a keyboard, a mouse, a display, an audio or voice, a visual or motion sensing device or other peripheral device standard in computer devices.

Computer 130 can be a desktop computer, a notebook, a tablet, a mobile computing device, a web server, a management server or any other electronic device or known computing device capable of receiving, sending and processing data. Computer 130 can be a laptop computer, a computing device used in a server system, or any programmable electronic device capable of communicating with mobile device 120 and other electronic devices in distributed data processing environment 100 via network 110. In various embodiments, computer 130 is a shared pool of configurable computing resources (e.g., networks, servers, storage, applications, and services) that act as a single pool of seamless resources when accessed such as used in a cloud-computing environment.

Computer 130 includes UI 133 and geofence database 135. UI 133 on computer 130 is any known user interface providing an interface between a user and computer 130, and enables a user of computer 130 to interact with programs and data on mobile device 120, computer 130 and other computing devices (not shown in FIG. 1). Computer 130 can receive and send data such as a mobile device location and geofence data from mobile device 120. Computer 130 may store geofence data such as geofence boundary locations for a geofence in geofence database 135. While depicted on computer 130, geofence database 135 may reside in one or more other computers (not shown in FIG. 1).

Figure 2:
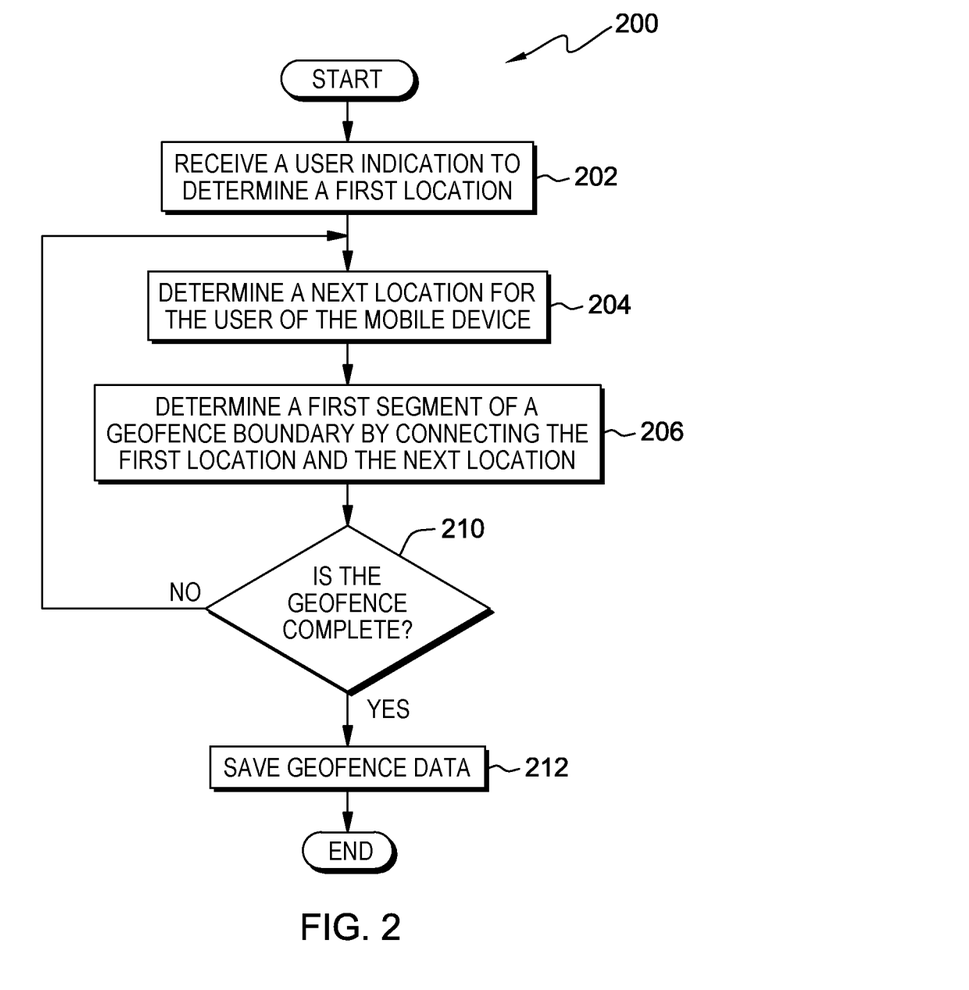
FIG. 2 is a flowchart depicting one example of a geofence determination method in accordance with at least one embodiment of the present invention.

FIG. 2 is a flowchart depicting one example of a geofence determination method 200 in accordance with at least one embodiment of the present invention. As depicted, FIG. 2 includes the steps that may be used in an embodiment of geofence application 121 to determine a geofence.

Geofence determination method 200 includes receiving a user indication to determine a first location (202). A user input on UI 123 intiates geofence application 121 to identify a first location or a starting point for the geofence. For example, the user may indicate geofence application 121 activation by touching an icon on UI 123 for geofence application 121 or saying a voice command such as "start geofence".

The first location of the user of mobile device 120 may be a starting point for a geofence boundary of the geofence as the user walks around a desired geofenced area. Geofence application 121 using location unit 122 may determine a first location of a set of sequentially received locations for mobile device 120 carried by the user as the user walks, drives or otherwise travels along a desired geofence boundary. The location of mobile device 120 may be determined by any known location determination technology (e.g., GPS, indoor positioning, radio frequency identification (RFID), etc.). In some embodiments, the capabilities of location unit 122 are included in geofence application 121. In one embodiment, computer 130 receives locations from mobile device 120, a radio frequency (RF) tag or the like carried by a user or vehicle travelling along a desired the geofence boundary of a desired geofenced area. In this example, geofence application 121 resides on computer 130 and determines the geofence.

In one embodiment, mobile device 120 is incorporated into an autonomous vehicle or robotic unit (i.e., not carried by a user) that travels along a desired geofence boundary. In this example, a first location of mobile device 120 on an automated vehicle or robot may be determined by geofence application 121 as the autonomous vehicle or robot travels along a programmed or a sensed path for the geofence boundary.

Determining a next location for the user of mobile device (204) may occur by one of several methods. Geofence application 121 may be configured with a default selection for determining a second location and each of the following or subsequent locations to identify the geofence. For example, a default configuration in geofence application 121 may determine a location every ten seconds.

Geofence application 121 may be configured to determine a next or second location and the frequency of subsequent location determination of mobile device 120 carried by a user or on a robotic vehicle based, at least in part, on any one of the following criteria. The criteria for determining a second location and subsequent locations may be a pre-set time or a time duration (e.g., every ten seconds) after each determined location (e.g., ten seconds after the previously determined location the next location is determined), a pre-set distance or a distance of movement of mobile device 120 (e.g., every five feet) between each determined location, a location determination when mobile device 120 changes direction (e.g., when geofence application 121 determines that the user carrying mobile device 120 turns to the left or is walking a curving path) or intermittently determined based on an input on UI 123 (e.g., mobile device 120 receives an indication by a touch on a touch screen to determine each location of the user of mobile device 120). In an embodiment, geofence application 121 uses a continuously activated location unit 122 for location tracking of mobile device 120 to determine a geofence boundary for a geofence. For example, geofence application 121 receives tracking of the location of mobile device 120 by a continuous or near real-time location tracking such as receiving near real-time GPS location data as mobile device 120 moves in a vehicle along a desired geofence boundary.

In various embodiments, a user of mobile device 120 inputs on UI 123 a selection of the criteria used to determine a second location and the subsequent locations used to create a geofence. For example, a user may input to geofence application 121 on a user interface of mobile device 120 a selection to determine each location for the geofence boundary based on a distance traveled from a previously determined location. The user may select to determine another or subsequent locations ten feet after a previous location (e.g., to determine a location every ten feet) as the user with mobile device 120 walks or otherwise travels along a desired geofence boundary for the geofence. In another example, a user may input a desired time duration between various determined locations.

Once the first and the next location are determined, geofence determination method 200 includes determining a first segment of a geofence boundary by connecting the first location and the next location (206). Geofence application 121 may create a geofence of any desired shape by connecting together successively determined locations in the order that the locations were determined by geofence application 121 to create segments of a geofence boundary that form the geofence. Geofence application 121 may connect together each sequentially determined location to create a set of one or more geofence boundary segments used to identify the desired geofenced area.

Geofence determination method 200 includes determining if the geofence boundary is complete (decision step 210). The determination that the geofence is complete (yes branch, decision 210) may occur by one of several methods. For example in a first method, geofence determination method 200 may determine that segments of the geofence boundary created from sequential determined locations of mobile device 120 fully enclose an area (e.g., when two of the geofence boundary segments cross each other to close or complete a geofence). In a second method, geofence determination method 200 may receive an indication such as a user input that the geofence is complete. In the second method, an indication that the geofence is complete may be a double tap on an icon in a touch screen or a voice command such as "complete geofence". When the first determined location and the last determined location connect for a last segment of the geofence boundary, the desired geofence boundary is complete (e.g., encloses an area) and the geofence is complete.

In one embodiment, a geofence is a partial perimeter geofence. A partial perimeter geofence may be a geofence that is composed of one or more segments of a geofence boundary that may not fully enclose an area. In a third method, for example, a user may select an icon, a line in a pop-up menu, indicate by a double tap on a touch screen or other similar known user input method to indicate a desire to create a partial perimeter geofence. In this third method, a user indication identifies a first location to determine a starting point of the partial perimeter geofence and indicates a last location for the geofence to complete the geofence as mobile device 120 travels or is carried by a user along a desired geofence boundary. The indication of the first location and last location determined by geofence application 121 in a partial perimeter geofence may be the same as described above for a geofence or may be a different indication (e.g., a double tap on the touch screen or a voice command such as "start partial perimeter geofence"). In this third method, geofence determination method 200 connects each of the determined locations sequentially to create segments of the geofence boundary in the partial perimeter geofence however, does not connect the last determined location to the first determined location. A partial perimeter geofence may be complete when each of the sequentially determined locations are connected in the order determined and the geofence boundary may be open (e.g., does not enclose an area). The partial perimeter geofence, for example, may be a geofence created as a curved geofence along a river's edge to keep people and/or pets out of the river or a geofence along the front of a series of loading dock doors to prevent uninspected product from being loaded on a truck.

Upon determining that the geofence is complete, geofence determination method 200 saves the geofence data (212) for the geofence created with the completed geofence boundary. In various embodiments, geofence application 121 stores the geofence data locally in persistent storage or in a database on mobile device 120 and/or sends the geofence data to geofence database 135 on computer 130. In embodiments, the stored geofence data can be used by, for example, geofence application 121 or one of a plurality of other programs.

Figure 3A:
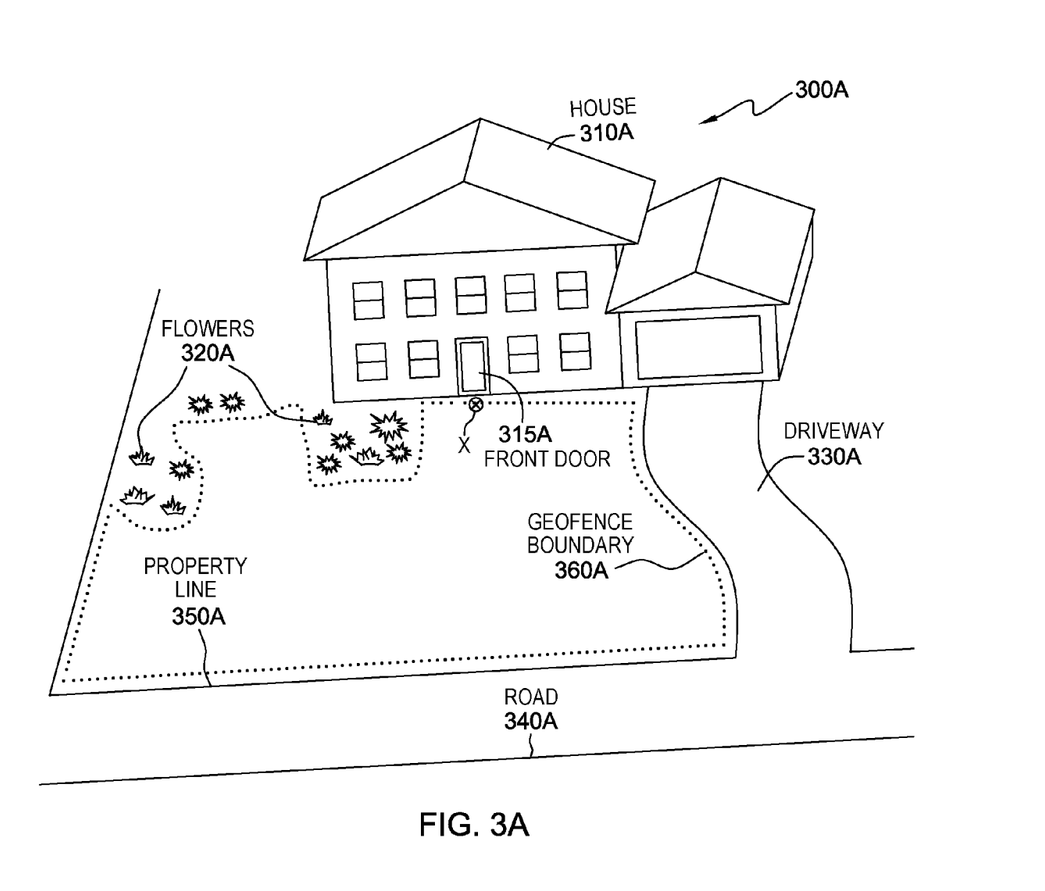
FIG. 3A is an illustration depicting an example of a non-standard geofence created based on sequentially determined locations of a mobile device in accordance with at least one embodiment of the present invention.

FIG. 3A is an illustration 300A depicting an example of a non-standard geofence created based on sequentially determined locations of mobile device 120 in accordance with at least one embodiment of the present invention. As depicted, FIG. 3A includes house 310A, front door 315A, starting point X, flowers 320A, driveway 330A, road 340A, property line 350A and geofence boundary 360A. The area enclosed within geofence boundary 360A may be an example of a desired area for a child to play.

Geofence boundary 360A may identify a boundary for a geofence used to notify a parent or a responsible adult when a child carrying a location aware device such as mobile device 120 (e.g., a smart phone, a RF tag, or the like) leaves the geofenced area. Geofence boundary 360A is an example of an irregular shaped geofence or an irregular shaped geofenced area created by geofence application 121 to protect the safety of a child and protect the desired flowers or home landscaping.

Geofence application 121 may create geofence boundary 360A when the user of mobile device 120 initiates geofence application 121 at starting point X. Geofence application 121 may have a default setting to record a location of the mobile device every three seconds when the user of mobile device 120 has initiated geofence application 121. The user of mobile device 120 travels along geofence boundary 360A and geofence application 121 records a location of mobile device 120 every three seconds. For example, the user may proceed to walk along house 310A a safe distance from driveway 330A (e.g., four feet away from driveway 330A). From the safe location near driveway 330A, the user with mobile device 120 turns and walks a curving path approximately four feet away from and parallel to driveway 330A recording the location of mobile device 120 held by the user every three seconds. At the end of driveway 330A, the user carrying mobile device 120 turns and walks a safe distance from (e.g., four feet away from) and parallel to road 340A to a spot near property line 350A.

Upon nearing property line 350A (e.g., two feet away from property line 350A), the user carrying mobile device 120 again turns and walks in a straight line approximately two feet parallel to property line 350A until reaching flowers 320A. At this location, the user turns and follows a curved path a safe distance such as two feet away from flowers 320 until passing another flowerbed with flowers 320A where the user approaches house 310A. Geofence application 121 continues to record the user's location every three seconds as the user moves around the various flowerbeds indicated by flowers 320A.

After walking around flowers 320A near the front door, the user walks along house 301A and geofence application 121 continues to determine the location of mobile device 120 every three seconds. The user completes the geofence by going to the starting point X at front door 315A and indicating by for example, a touch on geofence application 121 in the screen of mobile device 120 that the geofence is complete. In response, geofence application 121 completes the geofence and stores it locally in a database on mobile device 120 or in persistent storage of mobile device 120. Geofence application 121 creates the geofence identified by geofence boundary 360A by connecting sequentially the locations recorded or determined by geofence application 121 every three seconds as the user of mobile device 120 walks the perimeter of the lawn as depicted in FIG. 3A.

Figure 3B:
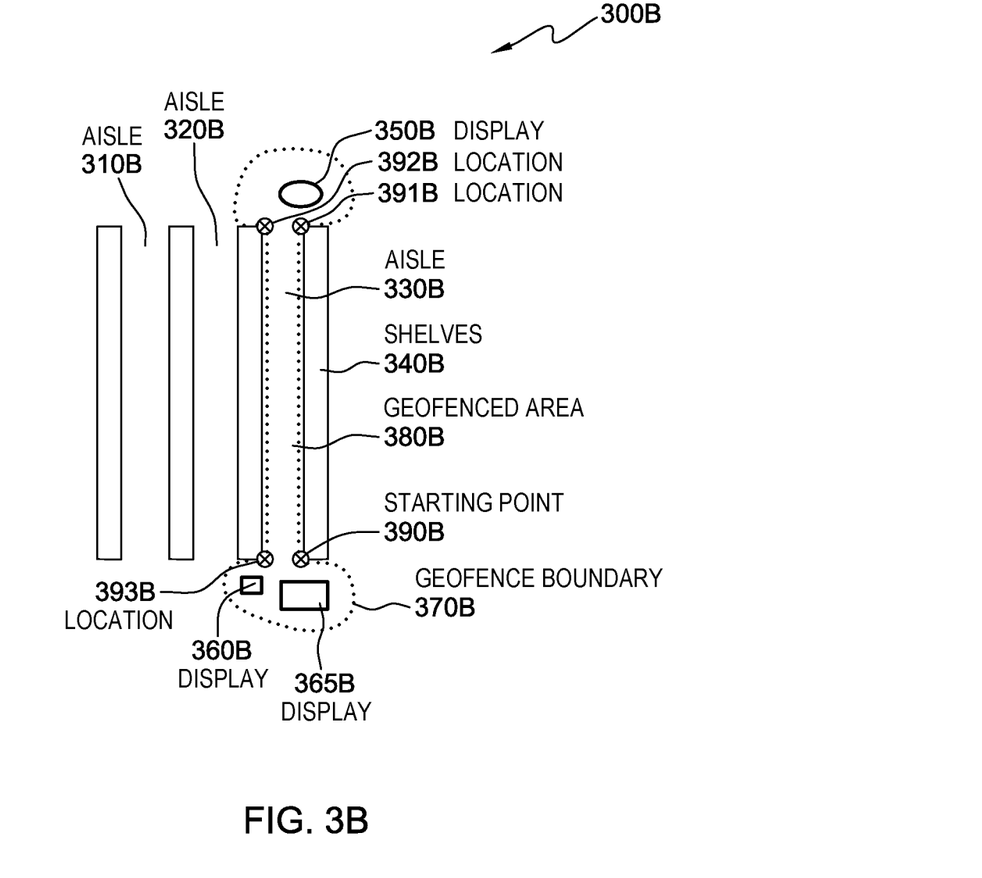
FIG. 3B is an illustration depicting an example of another non-standard geofence created based on intermittently received locations of a mobile device in accordance with at least one embodiment of the present invention.

FIG. 3B is an illustration 300B depicting an example of another non-standard geofence created based on intermittently received locations of mobile device 120 in accordance with at least one embodiment of the present invention. As depicted, FIG. 3B includes aisle 310B, aisle 320B, aisle 330B, shelves 340B, display 350B, display 360B, display 365B, geofence boundary 370B, geofenced area 380B, starting point 390B and location 391B, 392B and 393B. Illustration 300B depicts aisles 310B, 320B, and 330B where the area of aisle 330B and the area surrounding displays 350B, 360B and 365B at the ends of aisle 330B form geofenced area 380B surrounded by geofence boundary 370A in order to provide to customers with a mobile device in geofenced area 380B information on sale items in aisle 330B.

Geofenced area 380B may be created by geofence application 121 as a store employee at starting point 390B travels along geofence boundary 370B. In this example, the store employee has selected an option in geofence application 121 to determine a location of mobile device 120 when the user of mobile device 120 has changed direction when travelling along the geofence. In some embodiments, geofence application 121 is configured to determinate a location based on a change of direction in the movement of mobile device 120 where for example, the movement may be determined according movement in two dimensions (e.g., X and Y, latitude and longitude, etc.). In another embodiment, geofence application 121 is configured to disregard short, quick vertical movements of mobile device 120 (e.g., such as jiggling mobile device 120 or dropping mobile device 120) when determining a location for mobile device 120.

Geofence application 121 determines a first location as starting point 390B based on a received indication from the store employee, for example, on mobile device 120. The store employee walks without changing direction from starting point 390B to location 391B, a second location where geofence application 121 determines that the store employee with mobile device 120 changes direction based on data from the location determination unit on mobile device 120 (e.g., using indoor positioning and/or GPS data).

Geofence application 121 may create a first segment for geofenced area 380B by connecting the first two locations (e.g., starting point 390B and location 391B). As the store employee navigates around display, geofence application 121 determining changes in the store employee's direction records a series or a plurality of locations of mobile device 120 as the store employee walks from location 391B to location 392B. In one embodiment, geofence application 121 determines the location of mobile device 120 as it changes directions in near real-time (e.g., continuously tracks the location of mobile device 120). In an embodiment, geofence application 121 determines the location of mobile device 120 based on a pre-set time duration during changes in the direction of motion of mobile device 120 (e.g., mobile device 120 may be configured to determine a location every two seconds while the store employee carrying mobile device 120 is turning or walking in a curving path).

As the store employee walks from location 392B to location 393B, geofence application 121 determines no change in direction and, therefore geofence application 121 records only locations 392B and 393B. The store employee with mobile device 120 now navigates from location 393B back to location 391B changing direction as the employee walks around display 360B and display 365B. As the employees navigates from location 393B to location 391B changing direction, geofence application 121 determines a series of locations of mobile device 120 as the user walks around display 360B and display 365B. Upon receiving an indication from the store employee that the desired geofence boundary is now complete, geofence application 121 may complete connecting each of the sequentially determined locations for geofence boundary 360B to create a geofence for geofenced area 380B. Geofence application 121 may create the geofence for geofenced area 380B from periodically and/or continuously and sequentially determined locations of mobile device 120 as a user of mobile device 120 walks, drives or otherwise navigates geofence boundary 370B in the store.

In an embodiment, a geofence boundary such as geofence boundary 380B is a geofence boundary in a manufacturing site or a national park that keeps valuable items or animals in geofenced area 380B. Using the methods described above to create a geofence with geofence application 121, any shape geofence boundary may be formed from determined locations of a location-sensing device carried by a user or a vehicle moving along a desired geofence boundary.

Figure 4:
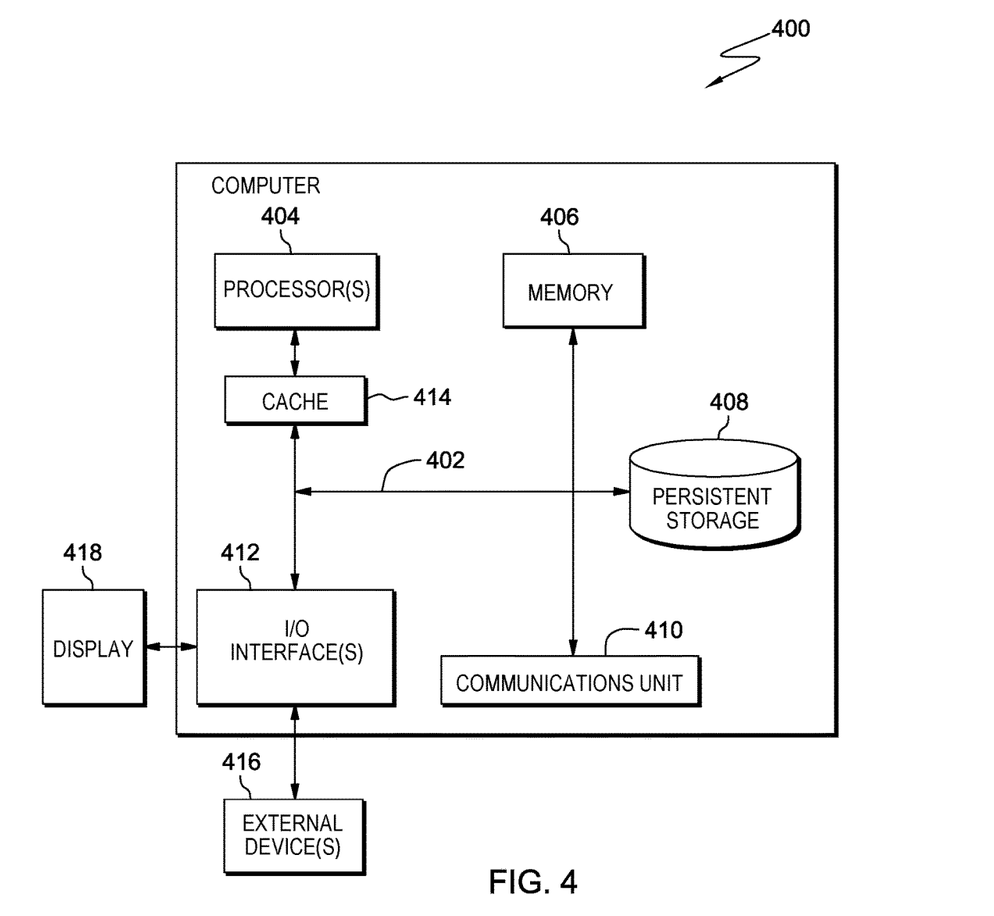
FIG. 4 is a block diagram depicting components of a computer system in accordance with at least one embodiment of the present invention.

FIG. 4 depicts a block diagram 400 of components of a computer system, which is an example of a system such as mobile device 120 and computer 130 within distributed data processing environment 100, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Mobile device 120 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410 and input/output (I/O) interface(s) 412. Communications fabric 402 can be implemented with any architecture designed for passing data and/or control information between processors (such as microprocessors, communications and network processors, etc.), system memory, peripheral devices and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data and data near recently accessed data, from memory 406.

Program instructions and data used to practice embodiments of the present invention are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory or any other computer readable storage media that is capable of storing program instructions or digital information.

The media used by persistent storage 408 may also be removable. For example, a removable hard drive may be used for persistent storage 408. Other examples include optical and magnetic disks, thumb drives and smart cards that are inserted into a drive for transfer onto another computer readable storage medium that is part of persistent storage 408.

Communications unit 410, in these examples, provides for communications with other data processing systems or devices, including resources of mobile device 120 and computer 130 and other computing devices not shown in FIG. 1. In these examples, communications unit 410 includes one or more network interface cards. Communications unit 410 may provide communications with either or both physical and wireless communications links. Program instructions and data used to practice embodiments of the present invention may be downloaded to persistent storage 408 through communications unit 410.

I/O interface(s) 412 allows for input and output of data with other devices that may be connected to mobile device 120. For example, I/O interface(s) 412 may provide a connection to external device(s) 416 such as a keyboard, a keypad, a touch screen, a microphone, a digital camera and/or some other suitable input device. External device(s) 416 can also include portable computer readable storage media, for example, devices such as thumb drives, portable optical or magnetic disks and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device. The computer readable program instructions may cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, a segment or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a geofence, the method comprising:
    receiving, by one or more processors, on a mobile device, an indication to determine a first location, wherein the mobile device is connected to a robot that travels a path for a desired boundary of the geofence;
    determining, by one or more computer processors, the first location based, at least in part, on movement of the robot in two dimensions along the path for the desired boundary of the geofence;
    determining, by one or more processors, a second location based, at least in part, on movement of the robot in two dimensions along the path for the desired boundary of the geofence; and
    connecting, by one or more processors, sequentially each of a set of sequentially determined locations along the path for the desired boundary of the geofence to determine the geofence, wherein the set of sequentially determined locations includes at least the first location and the second location.

2. The method of claim 1, wherein connecting, by one or more processors, sequentially each of the set of sequentially determined locations to determine the geofence further comprises:
    receiving, by one or more processors, a user indication that the set of sequentially determined locations for creating the geofence is complete; and
    connecting, by one or more processors, the first location and a last location of the set of sequentially determined locations to determine the geofence.

3. The method of claim 1, wherein connecting, by one or more processors, sequentially each of the set of sequentially determined locations to determine the geofence further comprises:
    determining, by one or more processors, the geofence is complete when connecting sequentially each of the set of sequentially determined locations creates an enclosed area for the geofence.

4. The method of claim 1, wherein each of the set of sequentially determined locations are determined by at least one of: a global positioning system, an radio frequency identification system, an optical positioning system, an indoor positioning system and a hybrid positioning system.

5. The method of claim 1, wherein each of the set of sequentially determined locations is determined based on a time duration after a previous location of the set of sequentially determined locations is determined.

6. The method of claim 5, wherein the time duration is one of a pre-set time duration and a user input time duration.

7. The method of claim 1, wherein each of the set of sequentially determined locations is determined based on a distance traveled by the mobile device after a previous location of the set of sequentially determined locations is determined.

8. The method of claim 7, wherein the distance traveled by the mobile device is one of a pre-set distance and a user selected distance.

9. The method of claim 1, wherein each of the set of sequentially determined locations is determined based on a change of direction of a movement of the mobile device.

10. The method of claim 1, wherein each sequentially determined location in the set of sequentially determined locations of the mobile device is determined by tracking a location of the mobile device.

11. The method of claim 1, wherein connecting, by one or more processors, sequentially each of the set of sequentially determined locations to determine the geofence occurs on one of the mobile device and a computer.

12. The method of claim 1, wherein the geofence is a partial perimeter geofence.

13. A computer program product for determining a geofence, the computer program product comprising:
one or more computer readable storage media and program instructions stored on the one or more computer readable storage media, the program instructions executable by a processor, the program instructions comprising instructions for:
receiving, on a mobile device, an indication to determine a first location, wherein the mobile device is connected to a robot that travels a path for a desired boundary of the geofence;
determining the first location based, at least in part, on movement of the robot in two dimensions along the path for the desired boundary of the geofence;
determining a second location based, at least in part, on movement of the robot in two dimensions along the path for the desired boundary of the geofence; and
connecting sequentially each of a set of sequentially determined locations along the path for the desired boundary of the geofence to determine the geofence, wherein the set of sequentially determined locations includes at least the first location and the second location.

14. The computer program product of claim 13, wherein connecting, by one or more processors, sequentially each of the set of sequentially determined locations to determine the geofence further comprises program instructions for:
receiving a user indication that the set of sequentially received locations for creating the geofence is complete; and
connecting the first location and a last location of the set of sequentially determined locations to determine the geofence.

15. The computer program product of claim 13, wherein connecting sequentially each of the set of sequentially determined locations to determine the geofence further comprises program instructions for:
determining the geofence is complete when connecting sequentially each of the set of sequentially determined locations creates an enclosed area for the geofence.

16. The computer program product of claim 13, wherein each of the set of sequentially determined locations is determined based on a time duration after a previously determined location of the set of sequentially determined locations.

17. A computer system for determining a geofence, the computer system comprising:
one or more computer processors;
one or more computer readable storage media; and
program instructions stored on the one or more computer readable storage media for execution by at least one of the one or more computer processors, the program instructions comprising instructions to perform a method comprising:
receiving, on a mobile device, an indication to determine a first location, wherein the mobile device is connected to a robot that travels a path for a desired boundary of the geofence;
determining the first location based, at least in part, on movement of the robot in two dimensions along the path for the desired boundary of the geofence;
determining a second location based, at least in part, on movement of the robot in two dimensions along the path for the desired boundary of the geofence; and
connecting sequentially each of a set of sequentially determined locations along the path for the desired boundary of the geofence to determine the geofence, wherein the set of sequentially determined locations includes at least the first location and the second location.

18. The computer system of claim 17, wherein each of the set of sequentially determined locations is determined based on a distance traveled by the mobile device after a previous location of the set of sequentially determined locations.

19. The computer system of claim 17, wherein each of the set of sequentially determined locations is determined based on a change of direction of a movement of the mobile device.

* * * * *